United States Patent
House (12)

(10) Patent No.: US 6,219,835 B1
(45) Date of Patent: Apr. 17, 2001

(54) MULTI-LANGUAGE DCE REMOTE PROCEDURE CALL

(75) Inventor: Daniel E. House, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/172,899

(22) Filed: Oct. 15, 1998

(51) Int. Cl.[7] .................................................. G06F 9/45
(52) U.S. Cl. ...................................... 717/7; 717/5; 717/6
(58) Field of Search ................................. 717/6, 7, 10, 5; 703/23

(56) References Cited

U.S. PATENT DOCUMENTS

| | | |
|---|---|---|
| 5,497,463 | 3/1996 | Stein et al. . |
| 5,648,965 | 7/1997 | Thadani et al. . |
| 5,818,448 * | 10/1998 | Katiyar .................................. 345/335 |
| 5,848,234 * | 12/1998 | Chernick et al. ................ 395/200.33 |
| 5,887,172 * | 3/1999 | Vasudevan et al. .................. 395/684 |
| 6,148,402 * | 11/2000 | Campbell ............................. 713/200 |

OTHER PUBLICATIONS

Anderson. Tools Eases Definition Of RPC Interfaces. Open System Today. pp. 56, Sep. 1994.*
IBM document SC24–5833, "Chapter 2: An Overview of the Interface Definition Language," Nov. 15, 1997, 2 pages.
IBM document SC24–5833, "Appendix B: Details of Extensions to IDL," Nov. 15, 1997, 3 pages.
Betz, M., "Building a CORBA Object Server," Software Development, No. 10, Vol. 3, Oct. 1995, p. 53(6).
Betz, M., "Interoperable Objects: Laying the Foundation for Distributed–Object Computing," Dr. Dobb's Journal, No. 11, vol. 19, Oct. 1994, p. 18(13).
Betz, M., "Networking Objects with CORBA," Dr. Dobb's Journal, No. 11, vol. 20, Nov. 1995, p. 18(6).
Hummes, J. et al., "Migrating from ISODE/ROSE to DCE/RPC: A Common Inteface and a Complier," Client/Server and Beyond: DCE, CORBA, ODP and Advanced Distributed Applications Proceedings of the IFIP/IEE International Conference on Distributed Platforms, 1996, Chapman & Hall Ltd., London, England, pp. 130–143.
Kara, D., "Seeing the Forest in Spite of the Trees," Software Magazine, No. 13, vol. 16, Nov. 1997, p. 57(4).
Kirtland, D., "The COM+ Programming Model Makes it Easy to Write Components in Any Language," Microsoft Systems Journal, Dec. 1997, pp. 19–27.

* cited by examiner

*Primary Examiner*—Mark R. Powell
*Assistant Examiner*—Wei Zhen
(74) *Attorney, Agent, or Firm*—Gates & Cooper LLP

(57) ABSTRACT

A method, apparatus, article of manufacture, and a memory structure for generating a remotely-invokable computer procedure in an arbitrary language. The method comprises the steps of describing a computer procedure interface in an arbitrary server program language, translating the computer interface from the arbitrary language to an interface definition language, compiling the translated procedure interface to produce a client stub and a server stub, and compiling and linking a client and server program to the respective client and server stubs. The apparatus comprises a computer network implemented system for performing the foregoing steps, and the article of manufacture comprises a program storage medium, tangibly embodying instructions for performing the foregoing method steps.

29 Claims, 9 Drawing Sheets

MULTI-LANGUAGE DCE REMOTE PROCEDURE CALL

BACKGROUND OF THE INVENTION

1. Field of the Invention

The present invention relates to systems and methods of performing computer procedures in network environments, and in particular to a method and system for generating a remotely invokable computer procedure arbitrary server and client program language.

2. Description of the Related Art

In the past, computer programs were primarily implemented on large, complex computers known as mainframes. In the past decade, there has been a trend away from such systems and towards network-based computing systems.

Network-based computing systems can implement many distributed processing techniques. One of these distributed computing environment (DCE) techniques is a client/server computing technology known as the Open Software Foundation Remote Procedure Calls (OSF/RPC, or simply RPC). Remote procedure calling is a programming technique wherein a "client" implemented in a client computer invokes a procedure as if it were local, that is, inside the client's program, when the procedure actually exists in another program implemented in another computer in the network, such as the network server. The underlying OSF/RPC support hides the complications arising from this distributed processing, allowing the programmer to code the procedure as if it were local to the client computer.

One difficulty with current RPC technology is that it is not usable from a wide variety of languages. In fact, RPC is currently defined only for use with a programming language known as "C." This requires the programmer to have a functional capability programming in "C" even if the underlying code for the procedure is written in a completely different program, such as COBOL or PL1. What is needed is device that allows the use of RPC by arbitrary programming language environments. The present invention satisfies that need.

SUMMARY OF THE INVENTION

To address the requirements described above; the present invention discloses a method, apparatus, article of manufacture, and a memory structure for generating a remotely invokable computer procedure.

The method comprises the steps of describing a computer procedure interface in an arbitrary server program language, translating the computer interface from the arbitrary language to an interface definition language, compiling the translated procedure interface to produce a client stub and a server stub, and compiling and linking a client and server program to the respective client and server stubs. The article of manufacture comprises a program storage medium, tangibly embodying instructions for performing the foregoing method steps.

The apparatus comprises a means for describing a computer procedure in an arbitrary language, a first compiler implemented on a server computer for translating the computer procedure interface from an arbitrary language to an interface definition language (OSF/IDL, for example), a second compiler, implemented in the server computer, for producing a client stub and a server stub, and modules, implemented in the client and server computer, for compiling and linking client and server programs implementing the computer procedure with the client and server stubs.

The present invention also describes a memory structure having a first delimiter specifying an arbitrary server program language, a second delimiter specifying one or more arbitrary client program languages, and a memory portion describing procedure interface characteristics.

The foregoing allows a programmer to generate code in an arbitrary language that allows a remote client computer to invoke programs implemented on a server computer.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
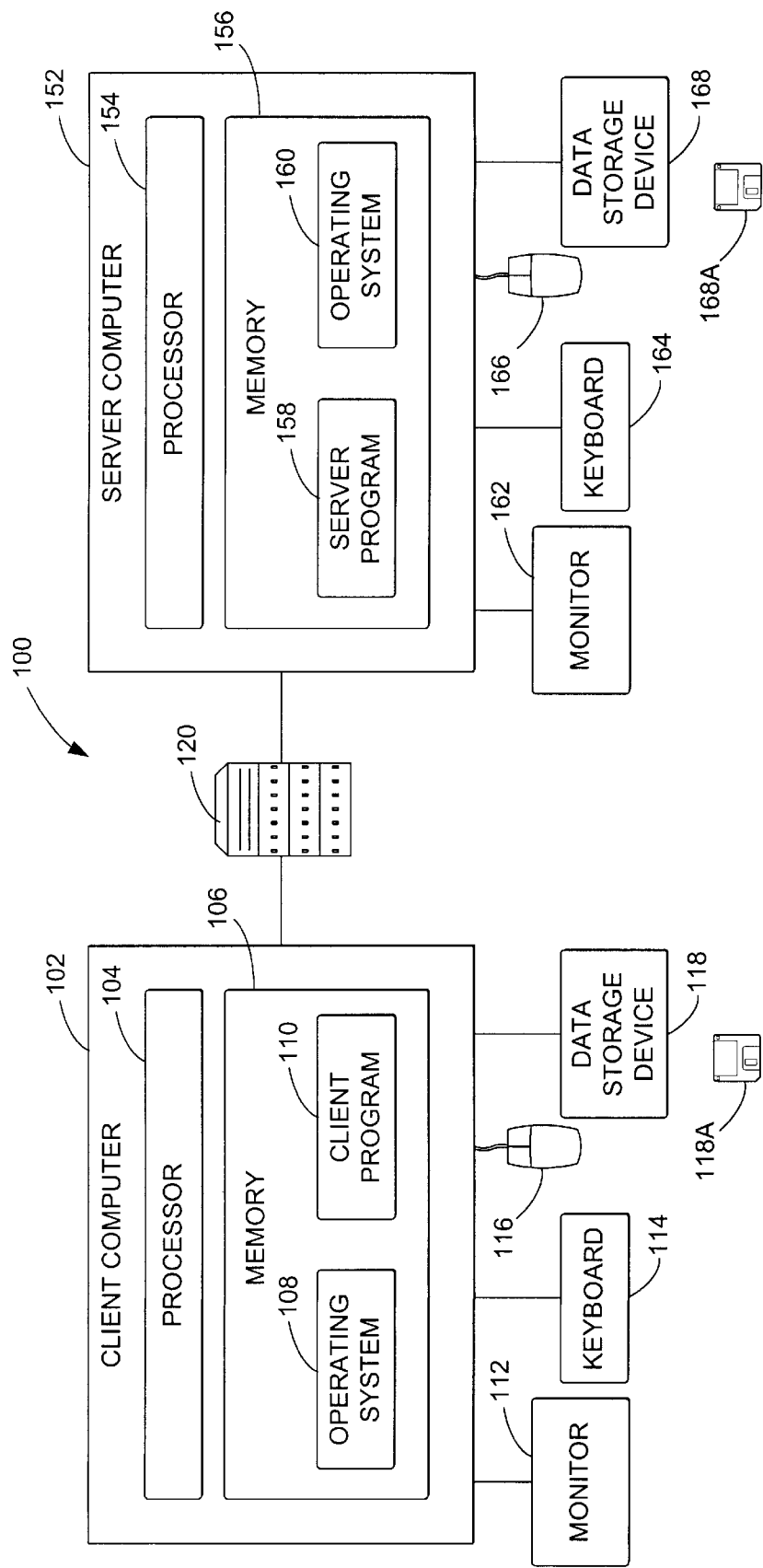
FIG. 1 is a block diagram presenting an exemplary hardware environment in which the present invention may be practiced.

FIG. 1 is a block diagram showing a client/server hardware environment 100 implementing one embodiment of the present invention. The client/server hardware environment 100 comprises a client computer 102 communicatively coupled to a server computer 152 via a network 120. The client computer 102 executes one or more client programs 110 operating under the control of an operating system 108.

Data storage device 118 tangibly embodies program steps to perform processor 104 instructions. The program storage device can include a CD-ROM, read/writeable CD-ROM, floppy disk, tape drive, magneto-optical storage apparatus, or similar device.

Generally, the computer programs and/or operating system are all tangibly embodied in a computer-readable device or media 118A, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs 110 and operating systems 108 are comprised of instructions which, when read and executed, cause the client computer 102 to perform the steps necessary to implement and/or use the present invention. Under control of the operating system 108, the computer programs may be loaded from memory 106, data storage devices 118, and/or data communications devices such as a modem or a network 120 connection into the memory 106 of the client computer 102 for use during actual operations.

A monitor 112 is communicatively coupled to the computer 102, and is used displaying data from the client computer 102. A keyboard 114 and a mouse 116 are also communicatively coupled to the client computer 102 to accept user input. The monitor 112 can also be used to accept data input from the client computer 102 user.

The server computer 152 also comprises a processor 154 and a memory 156 storing an operating system 160. The server computer's memory 156 also stores one or more server programs 158, which operate with the client program 110 as fully set forth herein. The server computer 152 is also communicatively coupled with a monitor 162, keyboard 164, mouse 166, and a data storage device 168 accepting data storage media 168A as described with respect to the client computer 102.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
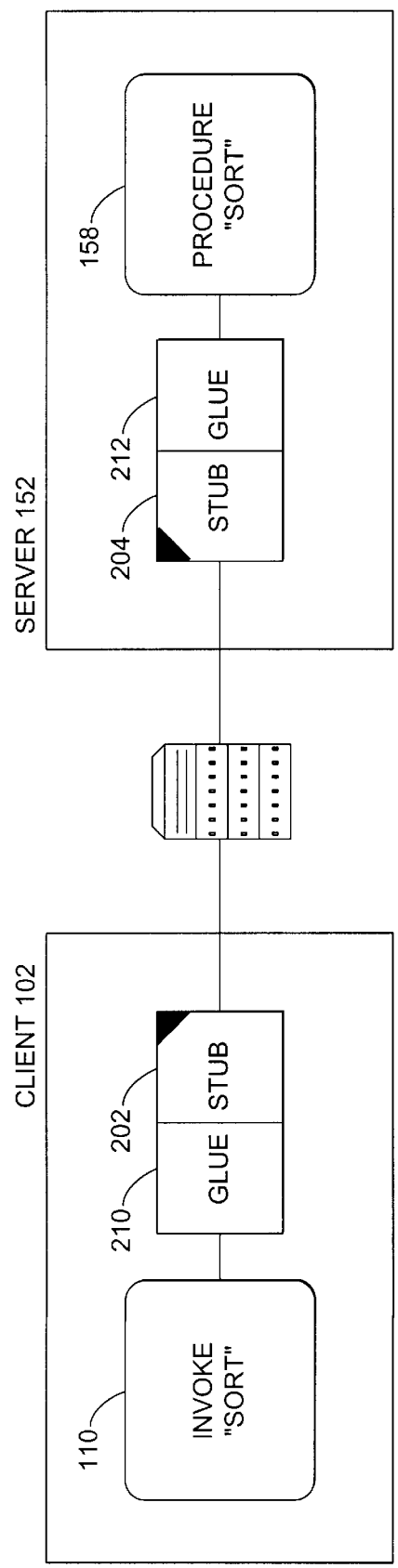
FIG. 2 is a diagram showing a client invoking a procedure on a server as if it were local to the client computer.

FIG. 2 is a diagram showing a client computer 102 running a client program 110 that invokes a "sort"procedure on a server computer 152 implementing a server program 158. The invocation occurs as if the sort procedure on the server were local to the client program 110. This is accomplished with the use of client glue 210 and a client stub 202 to the client program 110 (in this case, invoking a "sort" procedure) in the client computer 102 and a server stub 204 and server glue 212 to the server program 158 (in this case, the invoked "sort" procedure). The function of the client glue logic 210 and the server glue logic 212 is to translate the language of the RPC stubs ("C" in this case) into the language of the client or server implementation. For example, a server program written in FORTRAN uses FORTRAN datatypes. The server glue logic 212 understands which datatypes in FORTRAN translate into which datatypes in "C".

Figure 3:
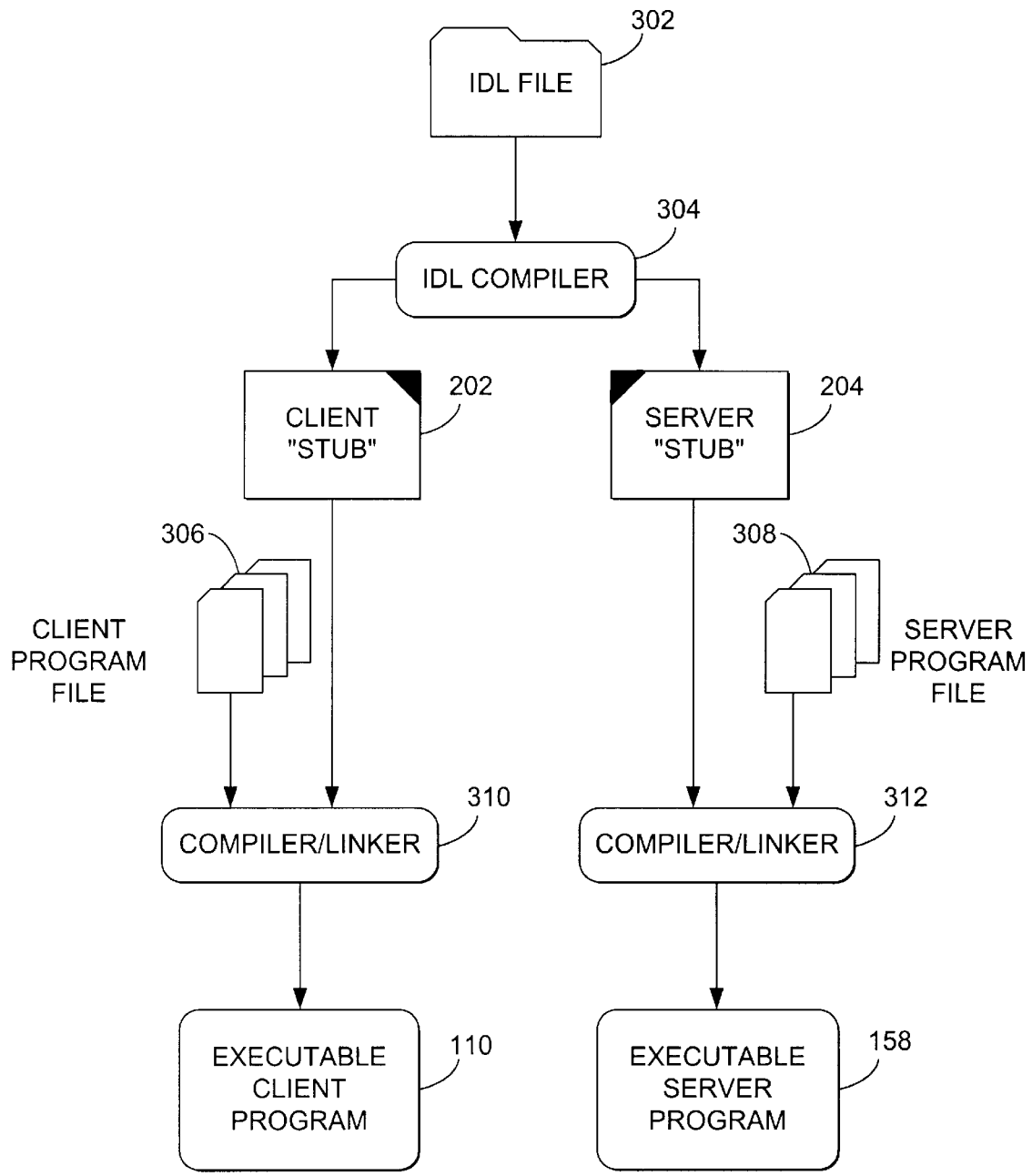
FIG. 3 is a diagram illustrating one method of generating a remotely invokable computer procedure.

FIG. 3 is a diagram showing a sequence of activities that can be followed to generate a server program 158 that can be remotely invoked by a client program 110. First, an interface presented by the server program 158 is described in a language known as Interface Definition Language (IDL). This language resembles the "C" programming language. Hence, application developers must understand "C" to create the IDL. IDL is a "declarative" language in that it lacks such programming constructs as branches or loops. IDL describes the interface and some selected interface qualities. IDL may have the procedure names and parameters, but no logic to implement the procedures.

The program described in the IDL file 302 allows the server program to be remotely invoked by performing remote procedure calls. The IDL description represented by the IDL file 302 is run through a special IDL compiler 304, which is typically provided with the OSF DCE/RPC package, thus producing a client stub 202 and a server stub 204. The client program stub 202 is a hidden piece of code which must be compiled and linked with the client program code represented by the client program file 306 to enable the client program 110 to communicate with the server program 158 without requiring that the developer of the client program 110 understand the complexities of network programming. The IDL compiler 304 also produces a server stub 204 that is compiled and linked with the server program 158 represented by the code in the server program file 308.

A server program 158 and a client program 110 are then written to use the interface described in the IDL. The server program 158 is then compiled and link-edited to the server stub 204, and the client program 158 compiled and link-edited to the client stub 202. Instead of dealing with the complexities of the network interface, the resulting executable client program 110 can now invoke programs executed on the server computer 152 by simply calling an interface which is described in the client stub 202 that was created by the IDL compiler 304. This information tells the developer of the client program 110 the signature of the remote procedure call, as is necessary to invoke it.

The client program 110 executable can now be started on any machine in the network. The hidden client stub 202 and its related code enables the client program 110 to communicate with the server computer 152, regardless of where in the network the server computer 152 resides. Other aspects of remote programming (including mechanisms to let servers advertise their existence and to ensure authentication of clients and servers and data privacy) are known in the art and are not discussed in further detail here.

The server program executable 158 can also now be started from any machine in the network. As long as it is started before any clients that attempt to communicate with it, the server program 158 will perform the "back-end" processing of RPCs. That is, the client program 110 will appear to invoke a local procedure call within the bounds of its executable code, but in actuality, the procedure is run remotely on the server computer 152. Although the foregoing example illustrates an interface implementing a single-function RPC, the principles described herein can be used to define an interface with any number of functions.

Figure 4:
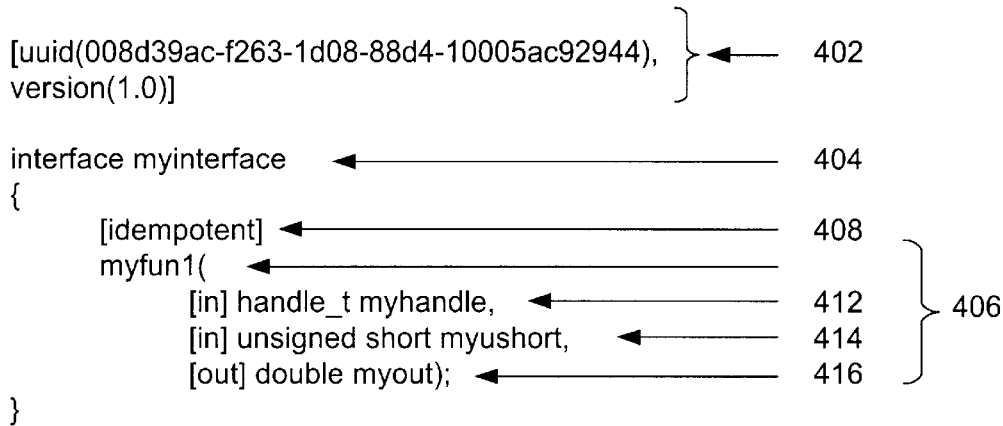
FIG. 4 is depiction of an exemplary IDL file.

FIG. 4 is a diagram illustrating the IDL file 302 for a RPC. The IDL file 302 looks much like code written in the "C" programming language. The IDL file 302 includes a header 402 comprising an identification "uuid," which is generated for the user and a version number, which is useful in tracking changes to the IDL file 302. Although not used by the client computer 102 when invoking the remote procedure, the IDL is given a name to help track it. This name is shown in FIG. 4 as "myinterface" and is labeled 404. Next, the characteristics of the interface are provided in square brackets after the IDL name. These characteristics include a descriptive characteristic (such as "idempotent" descriptor) 408 and a function 406, including the function name 410 ("myfun1") and a list of the parameters. These parameters include the input parameters 410 ("handle_t myhandle", and "unsigned shortmyushort,") that the server computer 152 expects the client computer 102 to pass to it when the procedure is remotely invoked, and the output parameters 416 ("double myout") expected to be returned to the client computer 102.

The present invention allows the user to write the IDL in an arbitrary programming language, thus allowing the developers of the client program 110 and the server program 158 to write RPC programs without understanding the "C" programming language. This is accomplished by changing the IDL definition to match the language in which application developers wish to use, and providing a new layer to translate this new IDL definition to something that the old IDL compiler will accept.

Figure 5:
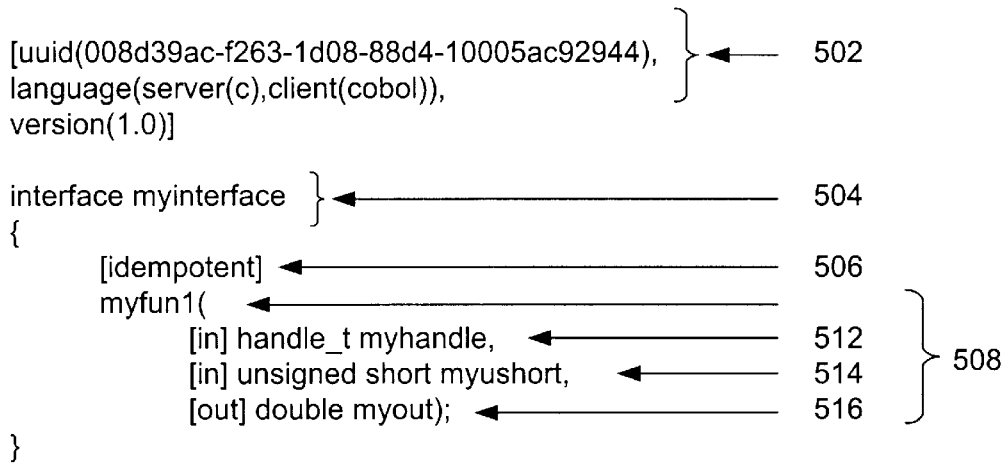
FIG. 5 is an exemplary depiction of a multi-language IDL file.

FIG. 5 presents an exemplary embodiment of a multi-language IDL (MLIDL). This IDL file describes an interface that the server computer 152 will export to members of the network, including the client computer 102. In this exemplary embodiment, the header 502 further comprises a language keyword that includes information about the client program 110 and the server program 158. In the example shown, the server language sub-keyword indicates that the server program 152 is written in the "C" programming language, while the client language sub-keyword indicates that client program 110 will be written in the COBOL programming language. Alternatively, the client language sub-keyword can specify a list of client languages.

In the illustrated example, the server sub-keyword indicates that the server program 158 is to be written in the "C" programming language. Hence, the remainder of the MLIDL (504–516) is written in "C." However, any arbitrary programming language could have been used (such as PL/1, C++, FORTRAN, or COBOL, HighLevelAssembler or a future supported language), so long as the programmer properly sets the server sub-keyword to indicate the language used. Had the server sub-keyword specified COBOL, the rest of the interface definition would use COBOL datatype declarations, instead of "C." In the preferred embodiment, only one value can be specified for the server sub-keyword and that value defines what language the rest of the MLIDL resembles.

The client sub-keyword indicates what language or languages the client programs will be written in. This affects internal processing because code must be generated to enable a client program to be written in the specified language(s). In the illustrated embodiment, the client sub-keyword indicates that the client program 110 will be written in COBOL so the generated stub/glue will "glue" the "C" stub to the client code.

Figure 6:
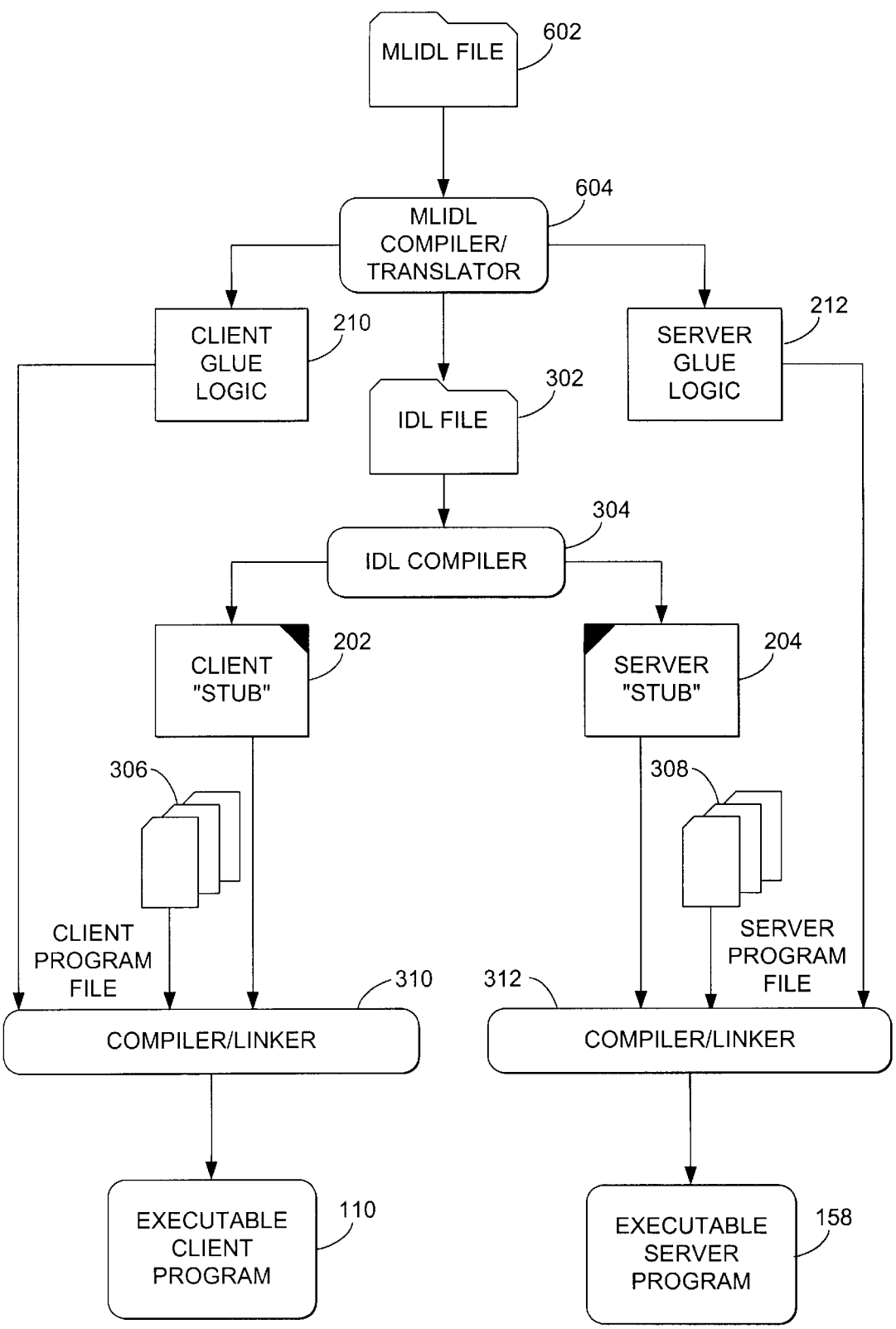
FIG. 6 is a diagram illustrating an exemplary method of generating a remotely invokable computer procedure using a arbitrary multi-language IDL file.

FIG. 6 is a diagram showing an overview of the process in constructing client/server programs using the MLIDL. First, the author of the server program 158 decides which language to write the server program 158, and specifies it in the server sub-keyword in the new MLIDL file 602. This determines the language used in the rest of the MLIDL specification. Optionally, the programmer may also specify a list of languages in which the client programs 110 may be written.

Next, the MLIDL file 602 is run through a MLIDL compiler/translator, which generates OSF DCE IDL 302 (similar to that which was described herein with respect to FIG. 4), plus client glue 210 and server glue 212. The OSF IDL compiler 304 is run with the output of the MLIDL compiler/translator 604, and thereby generates the client stub 202 and server stub 204, as described with respect to FIG. 3. In one embodiment, this step is not visible to application programmers/developers. Instead, part of the job of the MLIDL compiler/translator 604 is to invoke the IDL compiler without user knowledge or intervention. Next, a client program 110 (in files 306) is written in any language supported by the MLIDL. It is compiled and linked with the client stub 202 and the client glue 210 using a compiler/linker 310. Then, a server program 158 (in files 308) is written, compiled, and linked with the server stub 204 and the server glue 212 using the compiler/linker 312.

Figure 7:
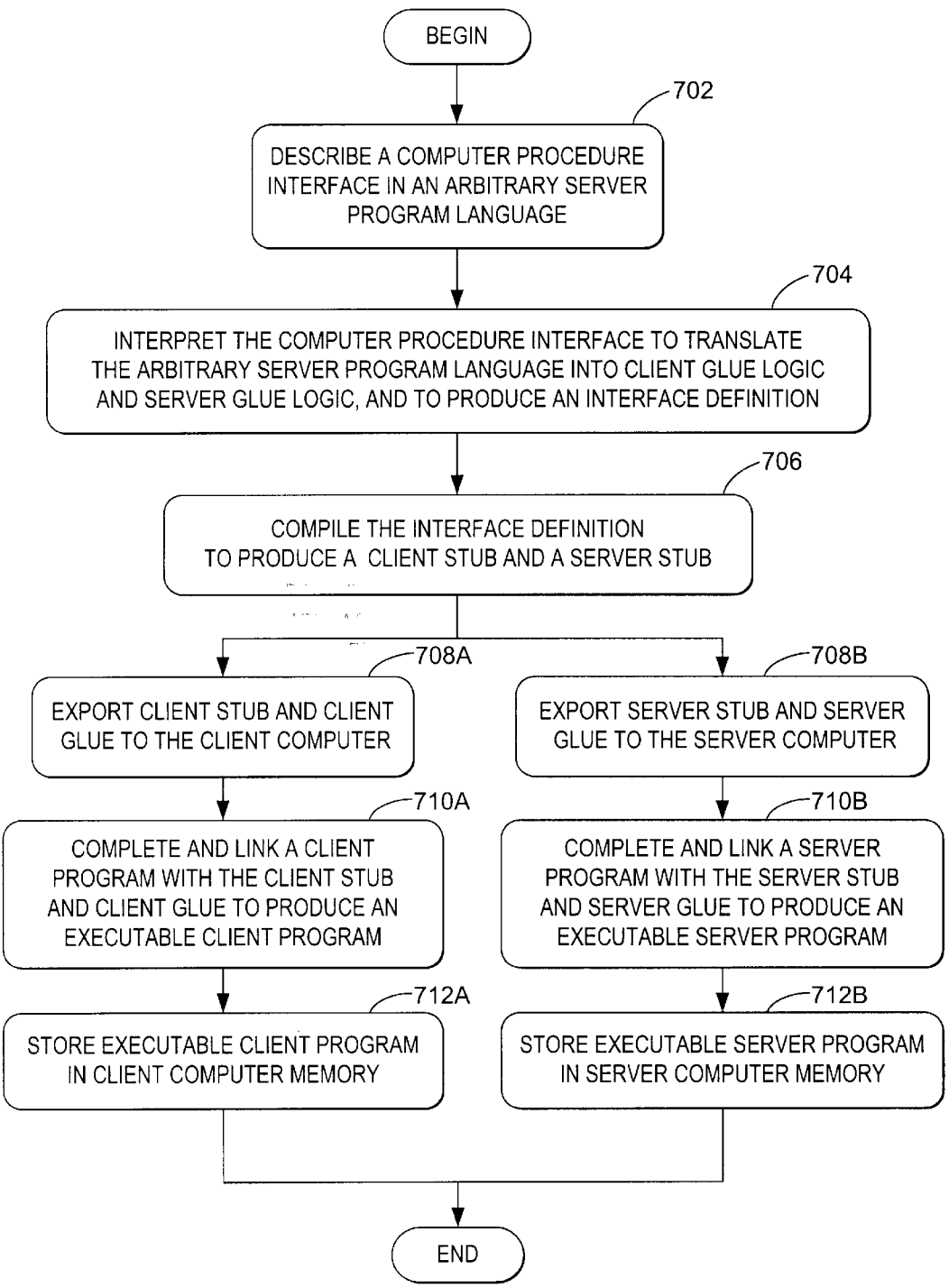
FIG. 7 is a flow chart illustrating method steps used to practice exemplary embodiment of FIG. 6.

FIG. 7 is a flow chart further describing the operations used to practice one embodiment of the present invention. First, a computer procedure interface is described 702 in an arbitrary server program language. Then, the computer procedure interface so described is interpreted 704 to translate the arbitrary server program language into client glue logic and server glue logic, and to produce an interface definition. In the preferred embodiment, the interface definition described in a standard IDL such as OSF DCE IDL 302. Next, the interface definition is compiled 706 with and IDL compiler to produce a client stub 202 and a server stub 204. The client stub 202 and server stub 204 are then exported to the client computer 102 for use therewith. This is illustrated in steps 708A and 708B, respectively. Next, a client program represented by client program file(s) 306 is compiled and linked 710A with the client stub 202 and client glue 210 to produce and executable client program 110. Similarly, a server program represented by server program file 308 is compiled and linked 710B to the server stub 204 and the server glue 212 to create an executable server program 158. These executable programs are stored in the client computer 102 and the server computer 152, as shown in blocks 712A and 712B, respectively.

In the foregoing disclosure, the MLIDL compiler/translator 604 is used to generate both the "glue" and the stubs (by invoking the OSF/IDL compiler 304) for the client computer 102 and the server computer 152. This embodiment has the advantage of providing the executable client program 110 and the executable server program 158 without requiring modification of the OSF/IDL compiler 304. In an alternative embodiment, the IDL compiler may be modified so to produce the extra "glue" logic and include it in the client stub 202 and the server stub 204.

Figure 8:
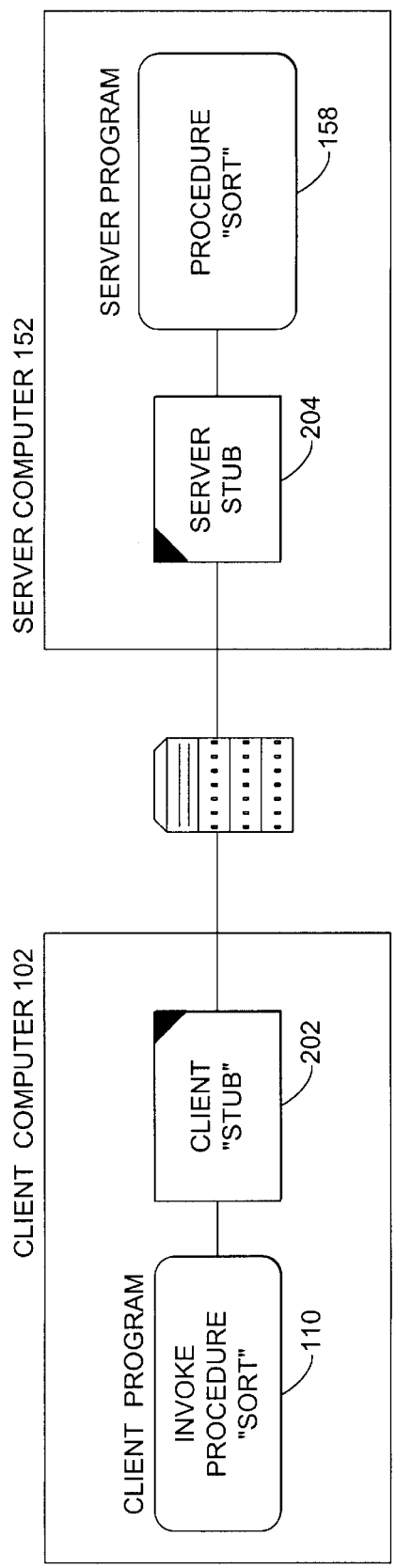
FIG. 8 is a diagram showing an alternative exemplary embodiment of a client invoking a procedure on a server.

FIG. 8 is a diagram illustrating how a client computer102 running a client program 110 can invoke a sort procedure on a server computer 152. Here, the necessary client glue logic 210 and server glue logic 212 is encompassed within the client stub 202 and the server stub 204.

Figure 9:
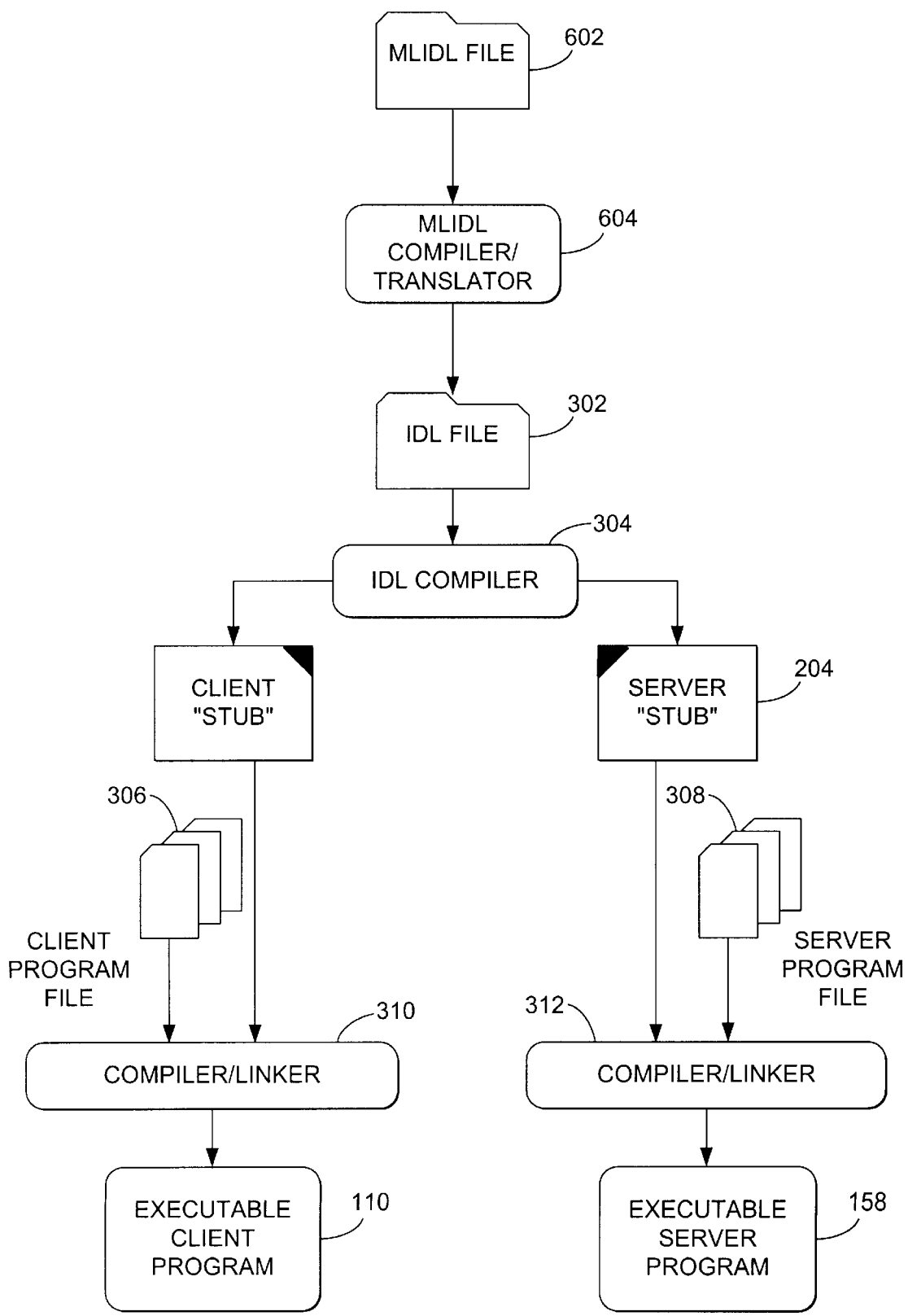
FIG. 9 is a diagram illustrating an alternative exemplary embodiment of generating a remotely invokable computer procedure using an arbitrary multi-language IDL file.

FIG. 9 is a diagram illustrating the sequence of activities that can be followed to generate the executable client program 110 and executable server program 158 in this embodiment. Here, the IDL compiler 304 is modified so that the client stub 202 and server stub 204 produced therefrom includes the applicable "glue" logic.

Figure 10:
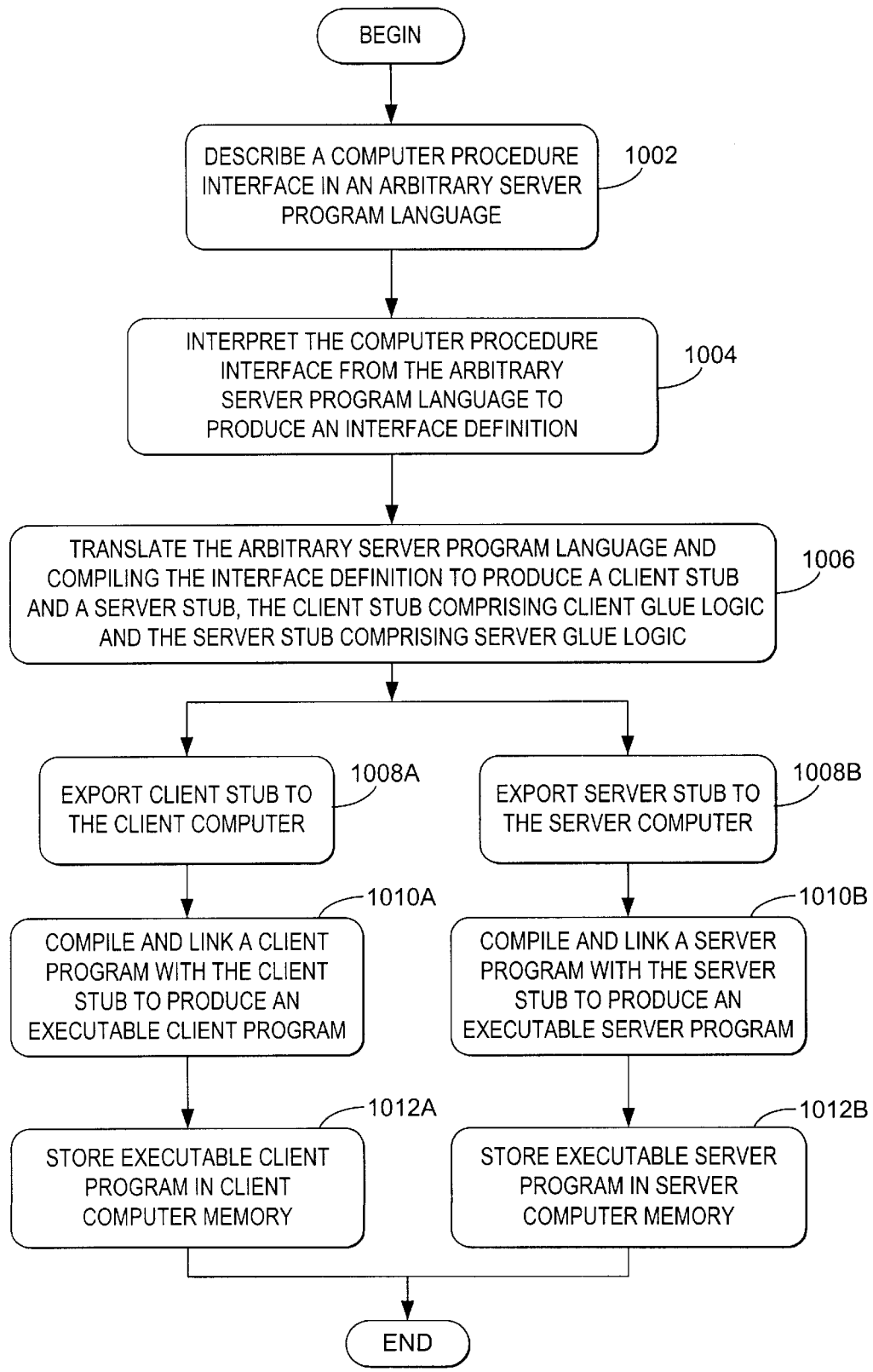
FIG. 10 is a flow chart illustrating the method steps used to practice the exemplary embodiment of FIG. 9.

FIG. 10 is a flow chart illustrating exemplary steps in implementing the technique shown in FIG. 9. First, a computer procedure interface is described 1002 in an arbitrary program language. Then, the computer procedure interface is interpreted 1004 to produce an interface definition. Next, the arbitrary server program language is translated and the interface definition is compiled to produce a client stub 202 and a server stub 204. The client stub 202 and server stub 204 each include the necessary glue logic. Then, the client stub 202 and server stub 204 are exported to the client computer 102 and the server computer 152, respectively. This is depicted in blocks 1008A and 1008B, respectively. The client program represented by the client program file 306 and the server program represented by the server program file 308 are then compiled and linked with the respective client stub 202 and server stub 204, thereby producing an executable server program. This is depicted in blocks 1010A and 1010B. Finally, the executable client program 110 is stored in the client computer 102 and the executable server program is stored in the server computer 152. This is depicted in blocks 1012A and 1012B.

CONCLUSION

This concludes the description of the preferred embodiments of the present invention. In summary, the present invention describes a method, apparatus, and article of manufacture for generating a remotely invokable computer procedure using an arbitrary language for the IDL.

The method comprises the steps of describing a computer procedure interface in an arbitrary server program language, translating the computer interface from the arbitrary language to an interface definition language, compiling the translated procedure interface to produce a client stub and a server stub, and compiling and linking a client and server program to the respective client and server stubs. The article of manufacture comprises a program storage medium, tangibly embodying instructions for performing the foregoing method steps.

The apparatus comprises a means for describing a computer procedure in an arbitrary language, a first compiler implemented on a server computer for translating the computer procedure interface from an arbitrary language to an interface definition language, a second compiler, implemented in the server computer, for producing a client stub and a server stub, and modules, implemented in the client and server computer, for compiling and linking client and server programs implementing the computer procedure with the client and server stubs.

The present invention also describes a memory structure having a first delimiter specifying an arbitrary server program language, a second delimiter specifying an arbitrary client program language, and a memory portion describing procedure interface characteristics.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of generating a remotely invokable computer procedure, comprising the steps of:
    describing a computer procedure interface in an arbitrary server program language;
    interpreting the computer procedure interface to translate the arbitrary server program language into client glue logic and server glue logic, and to produce an interface definition;
    compiling the interface definition in an interface definition language compiler to produce a client stub and a server stub;
    compiling and linking a client program with the client stub and the client glue logic to produce an executable client program; and
    compiling and linking a server program with the server stub and the server glue logic to produce an executable server program.

2. The method of claim 1, further comprising the steps of:
    storing the executable client program in a memory of a client computer; and
    storing the executable server program in a memory of a server computer.

3. The method of claim 1, wherein the procedure interface comprises:
    a first delimiter specifying the arbitrary server program language for the server program;
    a second delimiter specifying an arbitrary client program language for the client program; and
    procedure interface characteristics.

4. The method of claim 3, wherein the procedure interface characteristics comprise a definition for a function remotely invokable by the client computer, the definition comprising a function name.

5. The method of claim 1, wherein the procedure interface comprises a plurality of delimiters specifying a plurality of client programming languages, and the translated procedure interface is compiled to produce a client stub and a server stub for each client programming language.

6. The method of claim 1, wherein the procedure interface is described in a server computer, and the method further comprises the step of exporting the translated procedure interface from the server computer to a client computer.

7. An apparatus for generating a remotely invokable computer procedure, comprising:
    means for describing a computer procedure interface in an arbitrary server program language;
    means for interpreting the computer procedure interface to translate the arbitrary server program language into client glue logic and server glue logic, and to produce an interface definition;
    means for compiling the interface definition in an interface definition compiler to produce a client stub and a server stub;
    means for compiling and linking a client program with the client stub and the client glue logic to produce an executable client program; and
    means for compiling and linking a server program described in the server program language with the server stub and the server glue logic to produce an executable server program.

8. The apparatus of claim 7, further comprising:
    means for storing the executable client program on a client computer; and
    means for storing the executable server program on a server computer.

9. The apparatus of claim 7, wherein the procedure interface comprises:
    a first delimiter specifying the arbitrary server program language;
    a second delimiter specifying an arbitrary client program language for the client program; and
    procedure interface characteristics.

10. The apparatus of claim 9, wherein the procedure interface characteristics comprise a definition for a function remotely invokable by the client computer, the definition comprising a function name.

11. The apparatus of claim 7, wherein the procedure interface comprises a plurality of delimiters specifying a plurality of client programming languages, and the translated procedure interface is compiled to produce a client stub and a server stub for each client programming language.

12. The apparatus of claim 7, further comprising means for exporting the translated procedure interface from the server computer to a client computer.

13. A program storage medium, readable by a computer, embodying one or more instructions executable by the computer to perform method steps of the method steps comprising the steps of generating a remotely invokable computer procedure, the method steps comprising the steps of:

describing a computer procedure interface in an arbitrary server program language;

interpreting the computer procedure interface to translate the arbitrary server program language into client glue logic and server glue logic, and to produce an interface definition;

compiling the interface definition in an interface definition language compiler to produce a client stub and a server stub;

compiling and linking a client program with the client stub and the client glue logic to produce an executable client program; and compiling and linking a server program with the server stub and the server glue logic to produce an executable server program.

14. The program storage device of claim 13, wherein the method steps further comprise the steps of:

storing the executable client program on a client computer; and storing the executable server program on a server computer.

15. The program storage device of claim 13, wherein the procedure interface comprises:

a first delimiter specifying the arbitrary server program language for the server program;

a second delimiter specifying an arbitrary client program language for the client program; and procedure interface characteristics.

16. The program storage device of claim 15, wherein the procedure interface characteristics comprise a definition for a function remotely invokable by the client computer, the definition comprising a function name.

17. The program storage device of claim 13, wherein the procedure interface comprises a plurality of delimiters specifying a plurality of client programming languages, and the translated procedure interface is compiled to produce a client stub and a server stub for each client programming language.

18. The program storage device of claim 13, wherein the procedure interface is described in a server computer, and the method steps further comprise the step of exporting the translated procedure interface from the server computer to a client computer.

19. An apparatus for generating a procedure implemented in a server computer and invokable from a client computer, comprising:

means for describing a computer procedure interface in an arbitrary program language;

a first compiler, for interpreting the computer procedure interface to translate the arbitrary program language into an client glue logic and server glue logic, and for producing an interface definition;

an interface definition logic compiler for producing a client stub and a server stub from the interface definition;

a first module, for compiling and linking a client program with the client stub and the client glue logic to produce an executable client program; and a second module, for compiling and linking a server program with the server stub and the server glue logic to produce an executable server program.

20. The apparatus of claim 19, further comprising:

means for storing the executable client program in a client computer; and means for storing the executable server program in a server computer.

21. The apparatus of claim 19, wherein the procedure interface comprises:

a first delimiter specifying the arbitrary server program language for the server program;

a second delimiter specifying an arbitrary client program language for the client program; and procedure interface characteristics.

22. The apparatus of claim 19, wherein the procedure interface characteristics comprise a definition for a function remotely invokable by the client computer, the definition comprising a function name.

23. The apparatus of claim 19, wherein the procedure interface comprises a plurality of delimiters specifying a plurality of client programming languages and the translated procedure interface is compiled to produce a client stub and a server stub for each client programming language.

24. A method of generating a remotely invokable computer procedure, comprising the steps of:

describing a computer procedure interface in an arbitrary server program language;

interpreting the computer procedure interface from the arbitrary server program language to produce an interface definition;

translating the arbitrary server program language and compiling the interface definition to produce a client stub and a server stub, the client stub comprising client glue logic and the server stub comprising server glue logic;

compiling and linking a client program with the client stub to produce an executable client program; and compiling and linking a server program with the server stub to produce an executable server program.

25. The method of claim 24, further comprising the steps of:

storing the executable client program in a memory of a client computer; and storing the executable server program in a memory of a server computer.

26. The method of claim 24, wherein the procedure interface comprises:

a first delimiter specifying the arbitrary server program language for the server program;

a second delimiter specifying an arbitrary client program language for the client program; and procedure interface characteristics.

27. The method of claim 26, wherein the procedure interface characteristics comprise a definition for a function remotely invokable by the client computer, the definition comprising a function name.

28. The method of claim 24, wherein the procedure interface comprises a plurality of delimiters specifying a plurality of client programming languages, and the translated procedure interface is compiled to produce a client stub and a server stub for each client programming language.

29. The method of claim 24, wherein the procedure interface is described in a server computer, and the method further comprises the step of exporting the translated procedure interface from the server computer to a client computer.

* * * * *

UNITED STATES PATENT AND TRADEMARK OFFICE
CERTIFICATE OF CORRECTION

PATENT NO. : 6,219,835 B1 Page 1 of 1
DATED : April 17, 2001
INVENTOR(S) : Daniel E. House It is certified that error appears in the above-identified patent and that said Letters Patent is hereby corrected as shown below:

<u>Title page,</u>
Item [56], References Cited, OTHER PUBLICATIONS, Hummes, Jr., et al.,
"...Inteface" should read -- Interface --.

<u>Column 9,</u>
Line 57, after "into, "an" should read -- a --.

Signed and Sealed this

Thirtieth Day of July, 2002

Attest:

Attesting Officer

JAMES E. ROGAN
*Director of the United States Patent and Trademark Office*